(12) United States Patent
Lhuillier et al.

(10) Patent No.: US 9,550,483 B2
(45) Date of Patent: Jan. 24, 2017

(54) MASTER CYLINDER WITH FLOW LIMITATION SYSTEM

(71) Applicant: Robert Bosch GmbH, Stuttgart (DE)

(72) Inventors: Laurent Lhuillier, Le Blanc Mesnil (FR); Marc Rodriguez, Beverly Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 290 days.

(21) Appl. No.: 14/362,844

(22) PCT Filed: Dec. 14, 2012

(86) PCT No.: PCT/EP2012/075618
§ 371 (c)(1),
(2) Date: Jun. 4, 2014

(87) PCT Pub. No.: WO2013/087875
PCT Pub. Date: Jun. 20, 2013

(65) Prior Publication Data
US 2015/0068202 A1    Mar. 12, 2015

(30) Foreign Application Priority Data
Dec. 15, 2011 (FR) ..................................... 11 03907

(51) Int. Cl.
*B60T 11/22* (2006.01)
*B60T 11/20* (2006.01)
(Continued)

(52) U.S. Cl.
CPC ............... *B60T 11/22* (2013.01); *B60T 11/20* (2013.01); *B60T 11/224* (2013.01); *B60T 11/232* (2013.01)

(58) Field of Classification Search
CPC ......... B60T 11/20; B60T 11/22; B60T 11/224; B60T 11/232
(Continued)

(56) References Cited

U.S. PATENT DOCUMENTS 3,877,228 A    4/1975   Shellhouse
4,208,881 A    6/1980   Brademeyer et al.
(Continued)

FOREIGN PATENT DOCUMENTS

| CN | 1671585 A | 9/2005 |
| DE | 94 15 262 | 1/1996 |
| FR | 2827244 | 1/2003 |

OTHER PUBLICATIONS

International Search Report for PCT/EP2012/075618, dated Feb. 15, 2013.

*Primary Examiner* — Thomas E Lazo
(74) *Attorney, Agent, or Firm* — Norton Rose Fulbright US LLP; Gerard Messina

(57) ABSTRACT

A brake fluid reservoir is connected to a master cylinder by a neck which is arranged in an upper chamber of the master cylinder. Holes extend through a surface of a piston, opening to a pressure chamber. The piston extends through a bore hole of the master cylinder. A drill hole extends through an interior wall of the master cylinder, opening into the bore hole, thereby providing communication between the fluid reservoir and the pressure chamber. A floating orifice plate is arranged within the upper chamber, between the neck of the brake fluid reservoir chamber and the drill hole, such that the orifice plate forms a baffle that limits a flow rate of liquid from the brake fluid reservoir chamber to the pressure chamber; and includes supports pressing against a surface of the interior wall of the master cylinder and arranged around the first side of the drill hole.

11 Claims, 3 Drawing Sheets

(51) Int. Cl.
*B60T 11/232* (2006.01)
*B60T 11/224* (2006.01)

(58) Field of Classification Search
USPC .................................................. 60/584, 585
See application file for complete search history.

(56) References Cited

U.S. PATENT DOCUMENTS

| | | | |
|---|---|---|---|
| 4,445,333 A | 5/1984 | Coleman | |
| 4,773,224 A | 9/1988 | Sakamoto | |
| 5,636,517 A | 6/1997 | Mallmann | |
| 5,720,170 A | 2/1998 | Hageman et al. | |
| 6,438,955 B1 * | 8/2002 | Chiba | B60T 11/20 60/578 |
| 6,637,201 B2 * | 10/2003 | Hirayama | B60T 11/22 60/585 |
| 7,073,333 B2 * | 7/2006 | Tsubouchi | B60T 11/26 60/585 |
| 7,152,406 B2 * | 12/2006 | von Hayn | F15B 21/005 60/584 |
| 2003/0084665 A1 * | 5/2003 | Hirayama | B60T 11/22 60/585 |

* cited by examiner

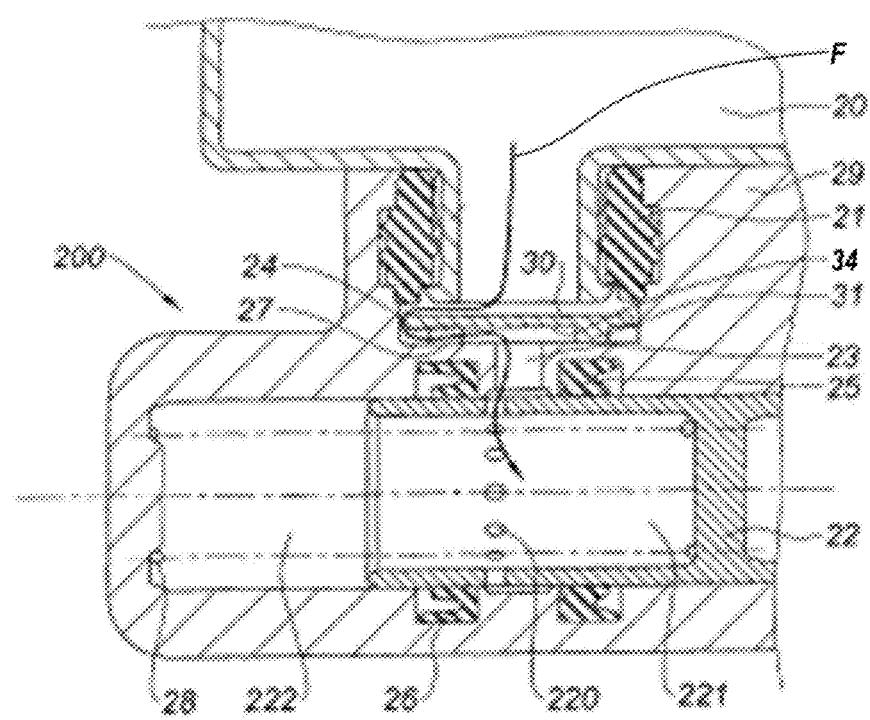
FIG. 2B
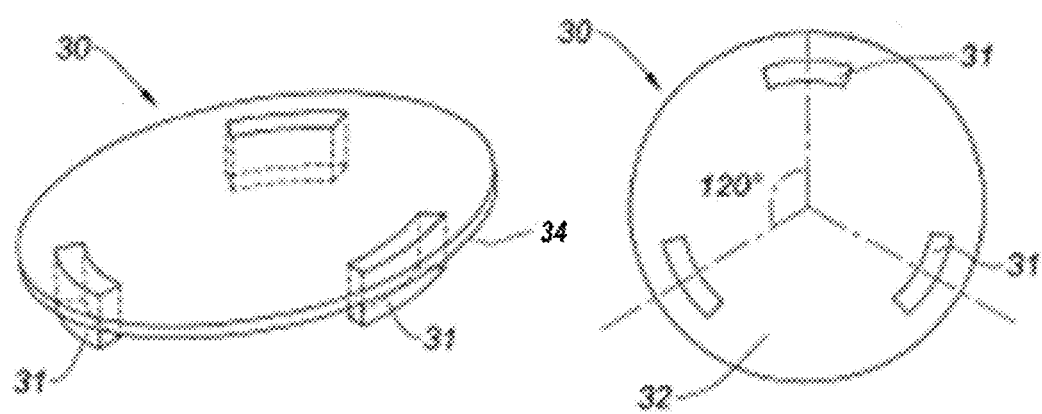
FIG. 3A
FIG. 3B

MASTER CYLINDER WITH FLOW LIMITATION SYSTEM

FIELD OF THE INVENTION

The present invention relates to a master cylinder equipped with a brake fluid reservoir connected to the master cylinder by a neck of the reservoir, which is engaged in a drill hole at the top of the master cylinder for communication with a pressure chamber through holes in a piston (primary piston and/or secondary piston) whenever said piston is at rest, through a drill hole crossing the wall of the master cylinder.

BACKGROUND

Known master cylinders include a primary piston and a secondary piston, generally made of aluminum and both installed in series in an axial bore hole of a brake master-cylinder body, generally made of machined aluminum. Such master cylinders are described in document FR 2,827,244. A push rod in a cavity of the primary piston serves to actuate movement of the primary piston, which pressurizes a primary pressure chamber, the secondary piston pressurizing a secondary pressure chamber. Primary and secondary springs push the pistons in the direction opposite the movement, thereby ensuring the increase in pressure.

The bore hole of the master cylinder is fed brake fluid from two feed holes, also referred to as drill holes, connected to the brake fluid reservoir in order to feed the primary and secondary pressure chambers. These drill holes emerge in annular chambers, annular seals known as "cups" being provided via the pistons on either side of the annular chambers.

Brake fluid is supplied to the pressure chambers when the pistons are at rest in the position shown in FIG. 1. Supply occurs by means of supply holes in the piston walls, and the supply access holes and the annular chambers are arranged to communicate with the interior of the primary and secondary pistons, to feed those chambers, respectively, through the supply holes in the walls of the pistons. The axis of those holes is generally perpendicular to the axis of the piston. Whenever the pistons advance (direction of arrow (d) in FIG. 1), the piston holes cross the seals, isolating the supply chambers and enabling the establishment of brake pressure in the primary and secondary pressure chambers.

The master cylinder assembly is mounted on a brake assist servomotor.

When the pistons are moved in the direction of arrow (d) by the push rod, cup 4 isolates the primary pressure chamber from the primary drill hole and cup 6 isolates the secondary pressure chamber from its respective drill hole. When the force of the push rod is relaxed, the volume of brake fluid accumulated in the brakes and the springs of the master cylinder push the pistons into rest position. At times, when the push rod is rapidly released, the brake fluid contained in the pressure chambers of the master cylinder can drop below atmospheric pressure due to the action of the springs, which push the pistons more rapidly than the arrival of brake fluid in the master cylinder. When the pistons reach rest position, communication between the reservoir at atmospheric pressure and the chambers of the master cylinder is directly established, thereby producing a sudden, rapid surge or flow of brake fluid, which generates noise in the master cylinder, known as a "fluid hammer."

The noises caused by the fluid hammer can be more or less attenuated depending on their location in the vehicle.

SUMMARY

Embodiments of the present invention provide an arrangement for limiting noises resulting from the circulation of brake fluid in a master cylinder. The arrangement is easily adaptable, depending on how it is applied in the vehicle, and does not require modification of the machined portions of the master cylinder.

In an example embodiment, a top of a chamber is partially closed by a lip of the neck of the reservoir and a bottom of the chamber communicates with a drill hole on the top of the brake master cylinder. A floating orifice plate moves freely inside the chamber, being kept flat between an upper stop formed by the top of the chamber and the bottom of the chamber. The floating orifice plate includes supports on its lower face to press freely around the drill hole at the bottom of the chamber, the orifice plate forming a baffle that limits the flow rate or velocity of liquid, e.g., brake fluid, from the reservoir to the pressure chamber in order to reduce or eliminate fluid hammer-type noises. The design of a master cylinder has become increasingly standardized and, depending on the use of a master cylinder in a vehicle, the fluid hammer phenomenon can be more or less felt by the driver of the vehicle. Additionally, the fact of realizing a modified master cylinder provides a simple and economical solution for resolving the fluid hammer problem without having to destandardize the manufacture of master cylinders. Effectively, according to the present invention, during the rapid return of the master cylinder pistons, the pressure in the pressure chambers is less than atmospheric pressure. Thus, when the pistons arrive at rest position, passageways in the form of holes in the pistons pass the seal zones formed by the cups, which enable passage between the reservoir and the pressure chambers. The orifice plate in the brake fluid passageway between the reservoir and the master cylinder creates a baffle that slows the flow of brake fluid and limits the noise generated by brake fluid from the reservoir as it reaches the pressure chamber. The fluid hammer is due to the column of liquid that suddenly flows down from the reservoir and strikes the walls of the interior cavity of the piston and pressure chambers during the rapid return of the pistons to rest position. Depending on the magnitude of the noise, the dimensions of the floating orifice plate can be modified to resolve the noise problem without degrading the function of the master cylinder, especially the flow rate functions needed for the operation of ABS (anti-lock braking system) or ESP (electronic stability program) systems. The variation in the height of the supports and the diameter of the floating orifice plate allow a compromise to be obtained between noise and flow rate, without destandardization of the master cylinder, suitable for the requirements of the client regarding noise and the flow rate requirements for operating ABS and ESP systems.

According to an example embodiment, the floating orifice plate is a disk equipped with supports in the form of tabs on at least the lower face of the floating orifice plate, so that, in the presence of a significant vacuum, there is no risk of the orifice plate adhering to the drill hole connected to the pressure chamber of the master cylinder and preventing filling.

In a particularly advantageous example embodiment, the floating orifice plate is shaped like a disk equipped with supports on its two faces so that installation of the floating orifice plate in the master cylinder chamber or chambers does not require particular care with respect to orientation given that there is no risk of the floating orifice plate adhering to the bottom of the chamber.

Given the dimensional characteristics of the floating orifice plate, its thickness with the supports, the height of the chamber that receives it, the width and length dimensions of the orifice plate, and the dimensions of the chamber section, there is no risk of the orifice disk being reversed and no longer resting more or less flat, so that an effective baffle is actually created between the inlet of the chamber from the reservoir and the outlet of the chamber in the bottom, communicating with the drill hole leading to the pressure chamber or chambers of the master cylinder.

According to an example embodiment, the supports are uniformly distributed. If the chamber includes a circular section, it is advantageous that the orifice plate is itself a piece in the shape of a circular disk whose diameter is less than the diameter of the section of the chamber but greater than the diameter of the mouth of the neck of the reservoir in the chamber, a diameter that is naturally greater than the diameter of the drill hole emerging into the bottom of the chamber.

According to an advantageous example embodiment, the orifice plate is a piece made of plastic material.

According to an advantageous example embodiment, the floating orifice plate includes a plate equipped with deformations serving as supports on one or both faces and, in particular, the floating orifice plate is a piece at least one edge of which is undulated to form supports.

Example embodiments of the present invention are described with respect to the attached figures.

BRIEF DESCRIPTION OF THE DRAWINGS

FIG. 2B is an axial cutaway, similar to that of FIG. 2A, of the master cylinder equipped with a floating orifice plate, according to an example embodiment of the present invention.

FIG. 3A is a perspective view of a floating orifice plate in the shape of a cylindrical part, according to an example embodiment of the present invention.

FIG. 3B is a top view of the floating orifice plate of FIG. 3A, according to an example embodiment of the present invention.

DETAILED DESCRIPTION

Figure 1:
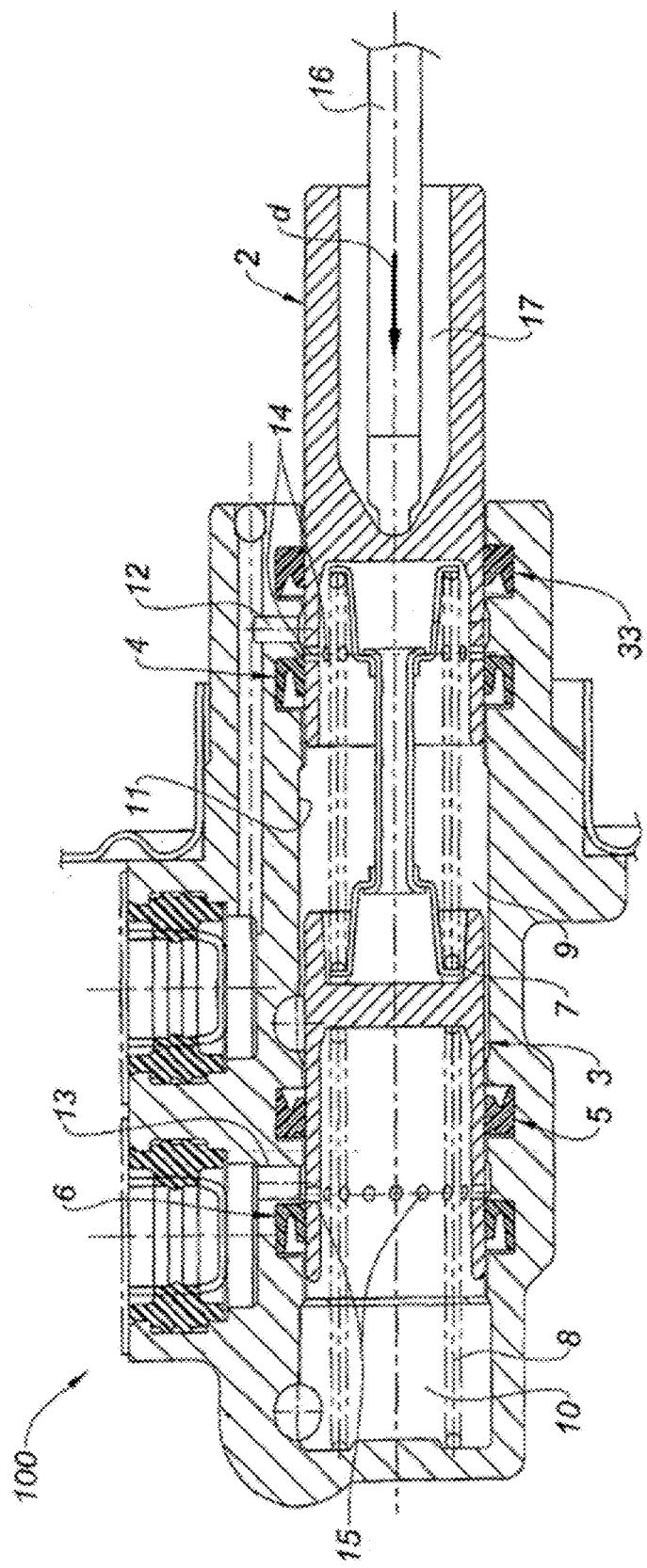
FIG. 1 is an axial cutaway of a conventional master cylinder.

FIG. 1 shows a brake master cylinder, 100, including bore hole 11, which receives primary piston 2, secondary piston 3, and primary 7 and secondary 8 springs. Pistons 2 and 3 serve to pressurize primary 9 and secondary 10 pressure chambers. Brake fluid drill holes 12, 13 are intended to be connected to a brake fluid reservoir (not shown). On either side of drill hole 12, cups 33, 4 are provided and, on either side of drill hole 13, cups 5 and 6 are provided. Whenever the master cylinder is at rest, primary piston 2 is in the position shown in FIG. 1. The walls of pistons 2, 3, equipped with supply access holes 14, 15, enable holes 12, 13 to communicate with the interior of each piston 2, 3 and primary pressure chamber 9 and secondary pressure chamber 8. At rest, cups 4, 6 do not block communication between drill holes 12, 13 and primary and secondary pressure chambers 9, 10, which are thereby supplied with brake fluid.

When braking force is exerted in direction (d) by push rod 16 in cavity 17 of primary piston 2, the latter moves in the direction of arrow (d), and cup 4 blocks supply access holes 14 and cup 6 blocks supply access holes 15. Because primary and secondary pressure chambers 9, 10 are isolated from drill holes 12, 13, pressure is established in chambers 9, 10. This pressure is proportional to the force exerted in direction (d) by push rod 16.

Figure 2A:
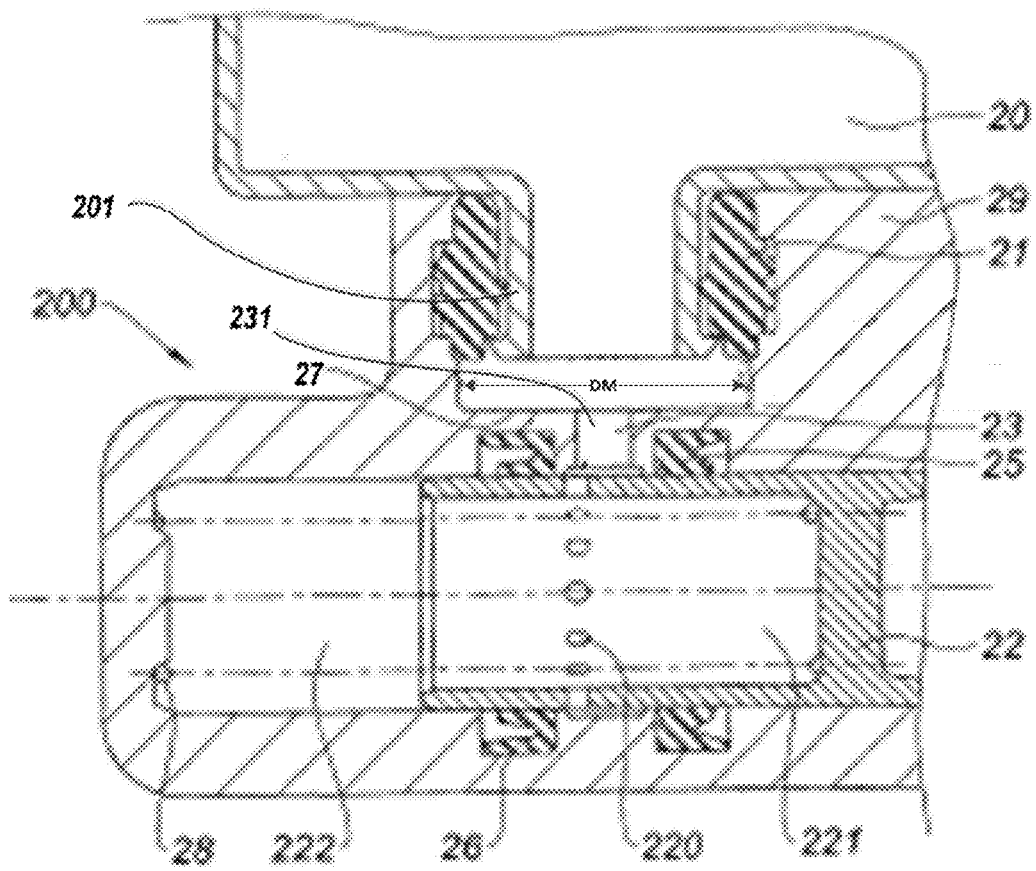
FIG. 2A is an axial cutaway of a master cylinder according to an example embodiment of the present invention.

FIG. 2A shows a portion of master cylinder 200 according to an example embodiment of the present invention, limited to the extremity of the tandem master cylinder on the secondary piston 22 side and secondary chamber 222, it being understood that the features of the invention, as shown and described, apply under the same conditions to the primary piston and to the primary chamber and to its communication with the reservoir through the end piece and drill hole 12 appearing in FIG. 1. Master cylinder 200 is equipped with a reservoir 20 connected to body 29 of master cylinder 200 through the interposition of sealing sleeve 21, which retains neck 201 of the reservoir in the master cylinder 200, which can be a tandem master cylinder.

Beneath neck 201, body 29 forms a chamber 24, the top of which is partially closed by the lip of neck 201 and the lip of sleeve 21. The bottom of chamber 24 is equipped with passage 23 realized in the wall of the body of the master cylinder. This cavity 24 is intended to accommodate a floating orifice plate 30, shaped like a disk whose dimensions are greater than those of the mouth of neck 201, but less than those of the section of chamber 24 in order to be able to move freely in chamber 24.

The thickness (e) of this floating orifice plate 30 is less than the height 'h' of chamber 24. The orifice plate 30 placed in chamber 24 (FIG. 2B) thus constitutes a baffle that slows the flow rate (flow) of brake fluid pumped by the vacuum created by piston 22 during its return to rest position.

Figure 2C:
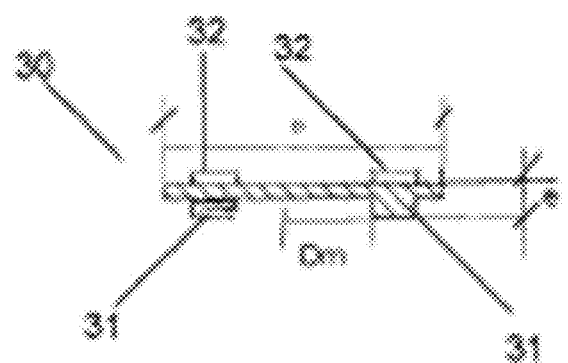
FIG. 2C is a cutaway of the floating orifice plate according to an example embodiment of the present invention.

FIG. 2C is a cutaway view of floating orifice plate 30 intended for chamber 24, in which it is found, as represented by FIG. 2B.

The circulation of brake fluid between reservoir 20 and cavity 221 through chamber 24, passage 23, and supply access holes 220, is shown by arrow F. Orifice plate 30, which is disk shaped or a thin cylindrical piece, never blocks passage 23 under the effect of the vacuum because it possesses support elements 31 and can rest against the interior bottom surface 27 of chamber 24 around entranceway 231 of passage 23 without the risk of becoming stuck to the bottom and hermetically blocking passage 23 under the effect of the vacuum.

As shown by the cutaway of FIG. 2C, orifice plate 30 is shaped like a circular disk of diameter D, smaller than diameter DM of chamber 24 and greater than diameter Dm of entranceway 231 of passage 23. Support elements 31 are bosses or tabs projecting from the lower face 34 of orifice plate 30. In an example embodiment, the top of the orifice plate is also equipped with bosses 32 to make the operation of orifice plate 30 independent of its mounting position in the reservoir 20/chamber 24 interface, thereby avoiding any assembly error.

Support elements 31 (32) and their arrangement on the faces of orifice plate 30, as well as the dimensions of orifice plate 30 (for example, its diameter in the case of a circular orifice plate) relative to the section of the chamber 24 are such that, regardless of the position of orifice plate 30 in chamber 24, there is no risk of the orifice plate 30 getting stuck and blocking passage 23.

Although, preferentially, for reasons of fabrication, orifice plate 30 is a circular disk because chamber 24 has a circular section, other shapes, such as a polygonal shape or star shape, are possible.

According to an example embodiment not shown, orifice plate 30 includes a surface with an undulating shape at least one edge of which is undulated or deformed with respect to the plane of the orifice plate and preferably on both sides to thereby realize supports similar to tabs or bosses 31, 32, preventing the adhesion that could block passage 23.

According to an advantageous example embodiment, floating orifice plate 30 is made of plastic.

Installation of floating orifice plate 30 in chamber 24 of the primary circuit or secondary circuit fed by either part of the tandem master cylinder takes place before installation of reservoir 20 in master cylinder 200.

If orifice plate 30 includes supports 31 on only one face, it must be installed in suitable fashion, whereas, if orifice plate 30 includes supports 31, 32 on both faces, no specific precaution is required during assembly.

Installation of the reservoir imprisons floating orifice plate 30 in chamber 24; the section of orifice plate 30 and that of the chamber, as well as the free height (h) of the chamber 24 eliminate the risk of the orifice plate turning over, so that the orifice plate is always arranged horizontally.

According to the example shown, the orifice plate 30 is a cylindrical piece equipped with at least three studs 31, is arranged in the brake fluid passageway, and is placed between reservoir 20 and an interior surface 27 of master cylinder 200 and inside chamber 24, with studs 31 resting against interior surface or "bottom" 27.

Bottom 27 is opened by the brake fluid passage 23, which is an annular chamber delimited by cups 25 and 26. The annular chamber extends to piston 22 of the master cylinder 200. The piston 22 includes holes 220 opening into cavity 221, which accommodates spring 28 resting against the bottom (viewing FIGS. 2A and 2B rotated counter-clockwise 90°) of cavity 221 and against the bottom (viewing FIGS. 2A and 2B rotated counter-clockwise 90°) of the borehole of the master cylinder 200, thereby creating pressure chamber 222. Floating orifice plate 30, here in the shape of a cylindrical part, serves to limit the velocity of brake fluid between reservoir 20 and pressure chamber 222 of master cylinder 200. Part 30, thus arranged, is used to create a baffle and limit the velocity of brake fluid in order to reduce or eliminate fluid hammer-type noises. Use of this cylindrical piece 30, equipped in this case with 3 studs, arranged in the brake fluid passageway and placed between the reservoir 20 and the mentioned interior surface 27 of master cylinder 200, creates a baffle that slows the brake fluid. Depending on the magnitude of the noise, the dimensions of cylindrical piece 30 can be modified accordingly, primarily in terms of its diameter or the height (a) of the studs. By modifying the diameter of the piece 30, the section of the passageway between the surrounding walls of chamber 24 and the outer edges of cylindrical piece 30 is defined. The height (a) of the studs helps define a section of passageway between bottom 27 of chamber 24 and the bottom face of cylindrical piece 30. These specifications of the dimensions of the floating orifice plate or cylindrical piece 30 can be used to adapt the geometry of the baffle and resolve the noise problem. Variation of the height of the studs and the diameter of the piece 30 can be used, therefore, to obtain a noise/flow rate compromise suitable for the client's requirements without destandardization of the master cylinder.

FIGS. 3A and 3B illustrate an example of an orifice plate 30 in the shape of cylindrical piece, preferably of plastic. According to advantageous example embodiment, cylindrical piece 30 includes at least three studs 31 that are 120 degrees apart.

Floating orifice plate 30 can be placed in the primary and/or the secondary circuit.

Although described above with respect to application of floating orifice plate 30 to the secondary portion of the master cylinder, an orifice plate of the same type applies to the supply circuit of the principal piston portion of the master cylinder.

The invention claimed is:

1. A master cylinder arrangement comprising:
a master cylinder;
a brake fluid reservoir chamber connected to the master cylinder by a first neck of the brake fluid reservoir chamber which is arranged in a first upper chamber of the master cylinder; and
a first floating orifice plate;
wherein:
supply access holes extend through a surface of a first piston, opening to a first pressure chamber interiorly of the piston;
the piston extends through a bore hole of the master cylinder;
a first drill hole extends through an interior wall of the master cylinder, from a first side of the drill hole, facing the brake fluid reservoir chamber, to a second side of the drill hole, that opens into the bore hole, such that the drill hole provides fluidic communication between the fluid reservoir chamber and the pressure chamber via the supply access holes of the piston when the piston is in a rest position;
the first side of the drill hole opens into a bottom of the upper chamber of the master cylinder;
a top of the upper chamber of the master cylinder is partially delimited by a bottom edge of the neck of the brake fluid reservoir chamber; and
the floating orifice plate:
is arranged loosely and horizontally within the upper chamber of the master cylinder, between the bottom edge of the neck of the brake fluid reservoir chamber and the first side of the drill hole, such that the orifice plate forms a baffle that limits a flow rate of liquid from the brake fluid reservoir chamber to the pressure chamber; and
includes supports on a bottom face of the floating orifice plate, the supports pressing against a surface of the interior wall of the master cylinder and arranged around the first side of the drill hole;
wherein the floating orifice plate is shaped like a disk equipped with supports that are on a top face of the floating orifice plate.

2. The master cylinder arrangement of claim 1, wherein the floating orifice plate is shaped like a disk equipped with the supports which are tab shaped.

3. The master cylinder arrangement of claim 1, wherein the floating orifice plate is a circular disk of a diameter that is smaller than a diameter of a circular section of the upper chamber in which the floating orifice plate is arranged, but larger than a diameter of the neck at the bottom edge of the neck.

4. The master cylinder arrangement of claim 1, wherein the supports are uniformly distributed about a central axis of the floating orifice plate.

5. The master cylinder arrangement of claim 1, wherein the floating orifice plate is a plastic part.

6. The master cylinder arrangement of claim 1, wherein at least an edge of the floating orifice plate is deformed to constitute reliefs that form at least some of the supports.

7. The master cylinder arrangement of claim 1, wherein:
the master cylinder is a tandem master cylinder;
the first pressure chamber is one of a plurality of pressure chambers of the tandem master cylinder, one of the plurality of pressure chambers of the master cylinder being a primary pressure chamber and another of the plurality of pressure chambers being a secondary pressure chamber;
the first piston is one of a plurality of pistons, one of the plurality of pistons being a primary piston delimiting the primary pressure chamber and another of the plurality of pistons being a secondary piston delimiting the secondary pressure chamber;
the first drill hole is one of a plurality of drill holes feeding respective ones of the primary and secondary pressure chambers;
the first upper chamber is one of a plurality of upper chambers, into each of which a respective one of the drill holes opens;
the first neck is one of a plurality of necks of the brake fluid reservoir chamber, each of which is fluidically connected to a respective one of the drill holes via a respective one of the upper chambers of the master cylinder; and
the first floating orifice plate is one of a plurality of floating orifice plate, each arranged in a respective one of the upper chambers of the master cylinder.

8. The master cylinder arrangement of claim 1, wherein:
the master cylinder is a tandem master cylinder;
the first pressure chamber is one of a plurality of pressure chambers of the tandem master cylinder, one of the plurality of pressure chambers of the master cylinder being a primary pressure chamber and another of the plurality of pressure chambers being a secondary pressure chamber; and
the first piston is one of a plurality of pistons, one of the plurality of pistons being a primary piston delimiting the primary pressure chamber and another of the plurality of pistons being a secondary piston delimiting the secondary pressure chamber.

9. The master cylinder arrangement of claim 1, wherein:
the first drill hole is one of a plurality of drill holes feeding respective ones of the primary and secondary pressure chambers; and
the first upper chamber is one of a plurality of upper chambers, into each of which a respective one of the drill holes opens.

10. The master cylinder arrangement of claim 9, wherein:
the first neck is one of a plurality of necks of the brake fluid reservoir chamber, each of which is fluidically connected to a respective one of the drill holes via a respective one of the upper chambers of the master cylinder; and
the first floating orifice plate is one of a plurality of floating orifice plate, each arranged in a respective one of the upper chambers of the master cylinder.

11. The master cylinder arrangement of claim 1, wherein:
the first neck is one of a plurality of necks of the brake fluid reservoir chamber, each of which is fluidically connected to a respective one of the drill holes via a respective one of the upper chambers of the master cylinder; and
the first floating orifice plate is one of a plurality of floating orifice plate, each arranged in a respective one of the upper chambers of the master cylinder.

* * * * *